US009171205B2

(12) United States Patent
Penna et al.

(10) Patent No.: US 9,171,205 B2
(45) Date of Patent: Oct. 27, 2015

(54) DEVICE AND METHOD OF BINARIZATION FOR PAYMENT OR ACCOUNTING DOCUMENTS

(71) Applicant: CTS electronics S.P.A., Ivrea (IT)

(72) Inventors: Barbara Penna, Ivrea (IT); Patrizia Ugo, Ivrea (IT)

(73) Assignee: CTS ELECTRONICS S.P.A., Ivrea (IT)

( * ) Notice: Subject to any disclaimer, the term of this patent is extended or adjusted under 35 U.S.C. 154(b) by 130 days.

(21) Appl. No.: 14/143,746

(22) Filed: Dec. 30, 2013

(65) Prior Publication Data

US 2014/0185909 A1  Jul. 3, 2014

(30) Foreign Application Priority Data

Dec. 31, 2012 (IT) .......................... TO2012A001174

(51) Int. Cl.
*G06K 9/00* (2006.01)
*G06K 9/38* (2006.01)

(52) U.S. Cl.
CPC ........ *G06K 9/00469* (2013.01); *G06K 9/00449* (2013.01); *G06K 9/38* (2013.01); *G06K 9/00442* (2013.01); *G06K 9/00463* (2013.01); *G06K 2209/01* (2013.01)

(58) Field of Classification Search
None
See application file for complete search history.

(56) References Cited

U.S. PATENT DOCUMENTS 9,008,431 B2 * 4/2015 Goto et al. .................... 382/182
2009/0185241 A1 * 7/2009 Nepomniachtchi .......... 358/474

OTHER PUBLICATIONS

Jesus A. De et al: "Segmentation of Brazilian bank check logos without a priori knowledge", Proceedings International Conference on Information Technology: Coding and Computing (Cat. N0.PR00540), Jan. 1, 2000, pp. 259-263, XP055072848, DOI: 10.1109/ITCC. 2000. 844231 ISBN: 978-0-76-950540-4.

Jayadevan, R. et al: "Automatic processing of handwritten bank cheque images: a survey", International Journal of Document Analysis and Recognition (IJDAR), vol. 15, No. 4, Dec. 16, 2012, pp. 267-296, XP055071850, ISSN: 1433-2833, DOI: 10.1007/s 1 0032-011-0170-8.

(Continued)

*Primary Examiner* — Wesley Tucker
(74) *Attorney, Agent, or Firm* — Sughrue Mion, PLLC

(57) ABSTRACT

A binarization device for payment or accounting documents including sensitive data located in respective data window provides a primary binarized document file of the document; a memory stores identification files including identifying images and location information associated to given types of documents; the data window can be identified and localized as comparison with the identification files of the memory; the contribution of the background is subtracted from the window file, the window file is binarized and filtered for spurious pixels obtaining a binarized window file; the binarized document file and the binarized window file are merged to provide the binarized window file in the data window; the evidence of the significant pixel is obtained by sequential analysis on groups of pixels, applying morphological expansion operators on each group of pixels and following erosion of said group of pixels.

17 Claims, 8 Drawing Sheets

(56) References Cited

OTHER PUBLICATIONS

Liu, D. et al: "Binarizing the Courtesy Amount Field on Color Chinese Bank Check Images", 2011 International Conference on Document Analysis and Recognition, Sep. 1, 2011, pp. 774-778, XP055072408, DOI: 10.1109/1CDAR.2011.160 ISBN: 978-1-45-771350-7.

Messaoud, I. B. et al: "New Binarization Approach Based on Text Block Extraction", 2011 International Conference on Document Analysis and Recognition, Sep. 1, 2011, pp. 1205-1209, XP055071847, DOI: 10.1109/1CDAR.2011.243 ISBN: 978-1-45-771350-7.

\* cited by examiner

DEVICE AND METHOD OF BINARIZATION FOR PAYMENT OR ACCOUNTING DOCUMENTS

RELATED APPLICATION

This application claims priority to Italian Application No. TO2012A001174, filed on Dec. 31, 2012 and entitled "Device and Method of Binarization for Payment or Accounting Documents", the content of which is incorporated herein by reference in its entirety.

FIELD OF THE INVENTION

The present invention relates to a device and a method for binarizing payment or account documents including sensitive data represented by the image files.

More specifically, the invention relates to a device and a method for binarizing payment or account documents files that operates on images with significant pixels belonging to the regions of the document containing sensitive data and background pixel.

BACKGROUND OF THE INVENTION

The payment or account documents include, for example, bank checks, payment bills, traveler's checks or traveler's checks and money orders, as documents for the transfer of money via Western Union or Money Gram. These documents comprise forms with basic information, primary information and other information printed with magnetic ink (MICR) and obtained by stringent printing specifications. The documents are available for financial institutions and other issuing institutions and are finalized for the payment by addition of sensitive data in data windows provided to this end.

The printing of the sensitive data can be performed by printers on counters for the public which are different from the ones which have generated the basic information and the primary information of the forms. A hand compilation of the document by the end user is also permitted. Therefore the quality of inking of the sensitive data can be poor and the sensitive data could be confused with the background of the document.

When the payment document is forwarded to a bank counter, it is scanned and gives rise to forming an image file in which the image is constituted by a matrix of dots with respective values of color/intensity (pixels). Then, the obtained information is transmitted to a reference bank or other financial institution to complete the process of final payment (compensation control) and storage of the respective data.

To reduce the processing time and limit the information to be transmitted and stored, the scanning can be performed in a gray scale with medium-good resolution, for example of about 200 or 300 dpi. Afterwards, the information is binarized for the processing with automatic machines and recognizing of the sensitive data by means of OCR devices and CAR/LAR decoders. This process is adequate for the basic information and the primary information of the documents but the binarization can lead to the loss of sensitive data, in the case of poor quality of the print.

During controls and checking of the document, the image of the binarized document is suitably displayed, allowing the operator to process the document in manual mode if he or she detects defects or absence of sensitive data in the displayed image. This results in slowing the process of transmission and storage of the document, with increasing of costs.

On the other hand, if the images were captured at high resolution and/or color, the binarization can improve but the required time of the process will result too long with image files of large size and transmission times longer, even in the case of perfectly recognizable documents with less accurate scans. This possibility is also impractical for the equipment currently used and which follow de facto standards which do not provide for the possibility of high resolution scans.

The known data binarization devices can be found inadequate; in particular, for example, when the sensitive data have been printed by dot matrix printers, widely used to obtain multicopy documents in transactions by public counters. The print can be fleeting, especially when the printers have been used ink ribbons next to exhaustion, rendering ineffective the known binarization devices.

SUMMARY OF THE INVENTION

An object of the present invention is therefore to provide a binarization device for payment or accounting documents including sensitive data, wherein the documents are represented by image files having significant pixels associated with the sensitive data and background pixels and wherein the sensitive data are located in a respective data window on a document of a given type of forms and can be constituted by alphanumeric characters. The binarization device comprises primary binarization means for obtaining a primary binarized document file of the document and further comprises: memory means for storing, identification files including identifying images and location information associated to respective given types of forms and the localization of the data window with respect to the given types of forms; window identification means for identifying and localizing in the image file of the document a window file including the significant pixels of the document, as comparison with the identification files of the memory means; background estimation means for estimating the contribution of the background among the pixels of said window file; and window background subtracting means for subtracting the contribution of the background from the window file, with significant pixels in evidence with respect to residual background pixels. Window file binarization means binarizes the background free window file; filtering means filters spurious pixels from the background free binarized window file; and merging means provides a document binarized image file of the document as merging of primary binarized document file and binarized window file to provide the binarized window file in the data window. The background estimation means comprises sequencing means for a sequential analysis on groups of pixels, by applying morphological expansion operators on each group of pixels and following erosion of said group of pixels for estimating the contribution of the background of the window to be subtracted from the pixels of the data window.

Another object of the present invention is to provide a method of binarization for payment or accounting documents including sensitive data, represented by file images with significant pixels associated with the sensitive data and background pixels of the document, and wherein the sensitive data are located in a respective data window. The method comprising the steps:

binarizing a file image of a document with formation of a primary binarized document file;

foreseeing memory means for storing, relatively to a series of document forms, identification files having identifying images and location information associated to the type of the document and the localization regarding the data window;

identifying and localizing in the image file, for comparison with the identification files, a window file, including the significant pixels of the sensitive data and background pixels of the data window;

estimating the contribution of the background among the pixels of the window file;

subtracting the estimated background from the pixels of the window file with formation of a background free window file having significant pixels in evidence with respect to residual background pixel of the window;

binarizing the window file cleared of the contribution of the background with formation of a background free binarized window file, filtering spurious pixels in the background free window file, forming a binarized window file, and merging the primary binarized document file and the binarized window file to provide the binarized window file in the data window; and wherein the estimation of the background comprises a sequential analysis for groups of pixels, by applying, in the window file, morphological expansion operators on each group of pixels and following erosion of said group of pixels.

BRIEF DESCRIPTION OF THE FIGURES

The characteristics of the invention will become apparent from the following description, exemplifying but not limitative, with reference to the accompanying drawings, in which.

DETAILED DESCRIPTION OF THE PREFERRED EMBODIMENTS

Figure 1:
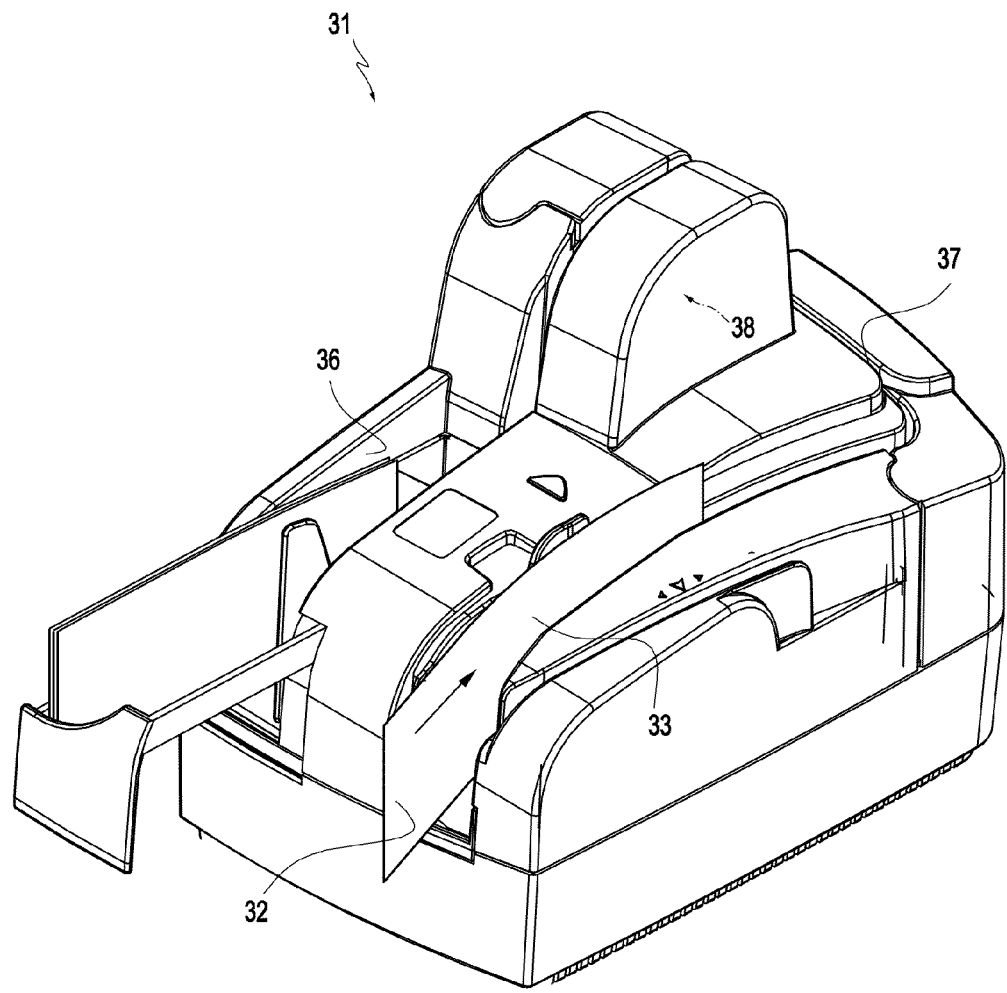
FIG. 1 is a perspective view of an equipment for the automatic processing of payment or accounting documents device that uses the binarization device in accordance with the invention.

FIG. 1 shows an equipment 31 for the automatic processing of payment documents, represented with 32, which uses the device of binarization in accordance with the invention.

In synthesis, the equipment 31 includes an input tray 33 for the documents to be processed and an output tray 36 for the processed documents and defines a path 37 for the documents in movement between the trays 33 and 36.

Motion sensors, one or more reading heads, a printer (not shown) and one or two image sensors 38, are arranged along the path 37. The reading head or heads are provided for reading any characters printed with magnetic ink. The sensor or sensors 38 are, for example, of the type known as CIS (Contact Image Sensor) arranged transversely to the path 37 for scanning the image of a face or both faces of the document 32 in transit along the path 37.

The equipment 31 is of a known type, for example constituted by a scanner LS 150 produced by CTS Electronics S.p.A., for processing payment documents such as checks, bills, post bulletins and payment orders (such as Money Order). The scanning is in grayscale with a resolution up to 300 dpi.

Figure 7:
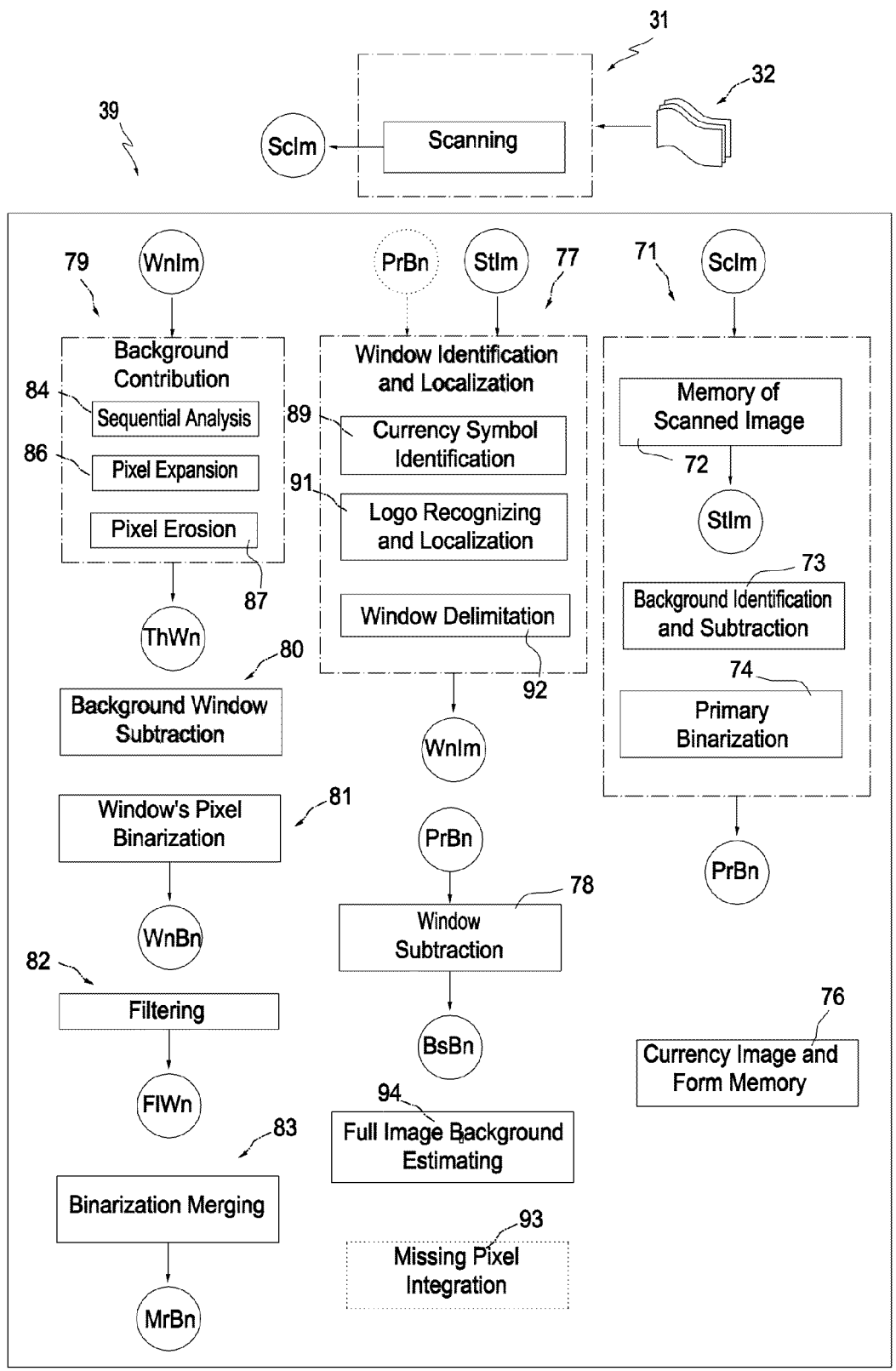
FIG. 7 is a block diagram of the binarization device of the invention.

The equipment 31 has an electronic control unit and is connected to a counter terminal with a display, not shown, in turn connected to a host central system. A binarization device 39 (See FIG. 7), of software type, is associated to the equipment 31 for binarizing the images scanned from the processed documents before the forwarding to the central system. The binarization device 39 can comprise operating components belonging to the equipment 31 and/or the local terminal or a local server.

The information binarized by the equipment 31 is then transmitted to the central system of the bank or financial institution, in a known manner, to complete the process of final payment (compensation control) and storing the relevant data.

Figure 2:
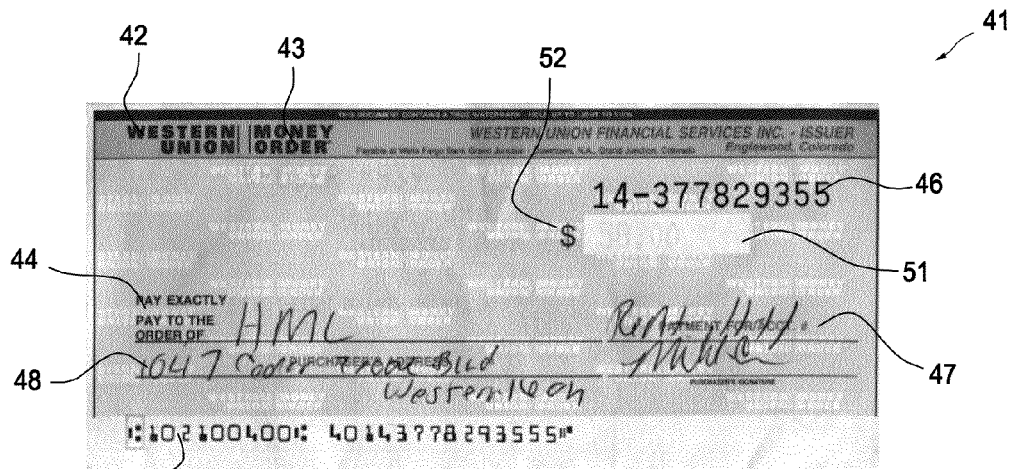
FIG. 2 shows a payment document processed by the equipment of FIG. 1.
Figure 3:
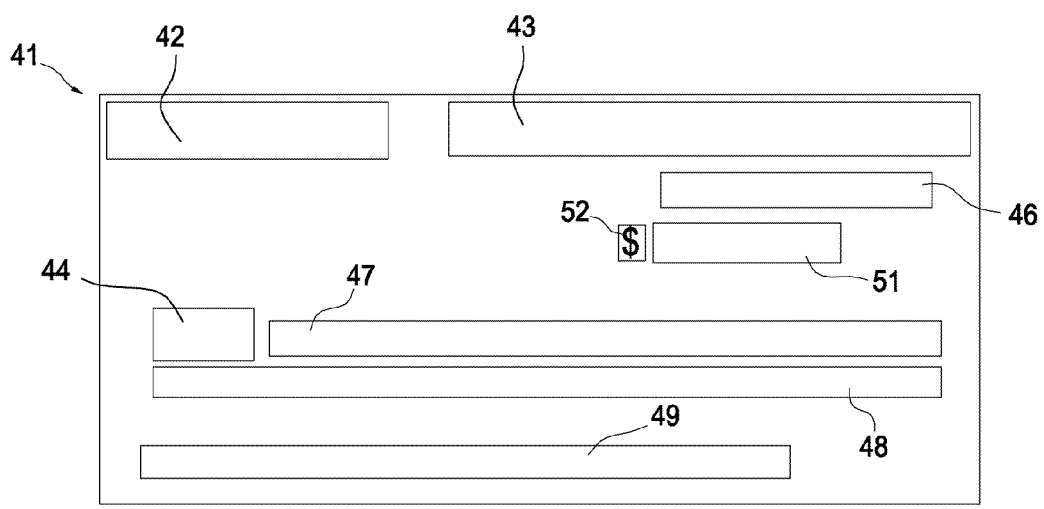
FIG. 3 is a schematic view of the document of FIG. 2.
Figure 3A:
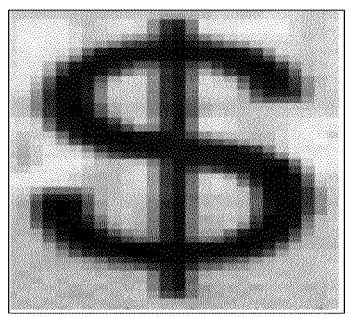
FIG. 3a shows a detail of the document FIG. 2.

FIG. 2 shows a document 32 represented by a payment order 41 manageable by the equipment 31 of FIG. 1, widely used for settling commercial transactions, transfer of money and purchase payment. As shown schematically in FIG. 3, the payment order 41 is constituted by a form (template) with basic information 42, 43, 44 and 46 including images and alphanumeric characters of the issuing institution, typology of the document, payment instructions and consecutive number of the document. Primary information 47 and 48 is also present, including, for example, name and address of the beneficiary and other information 49 printed with magnetic ink (MICR). The payment order 41 also includes a data space or data window 51 for sensitive data, such as information concerning the amount to be paid, at a side of a currency symbol 52.

Figure 5:
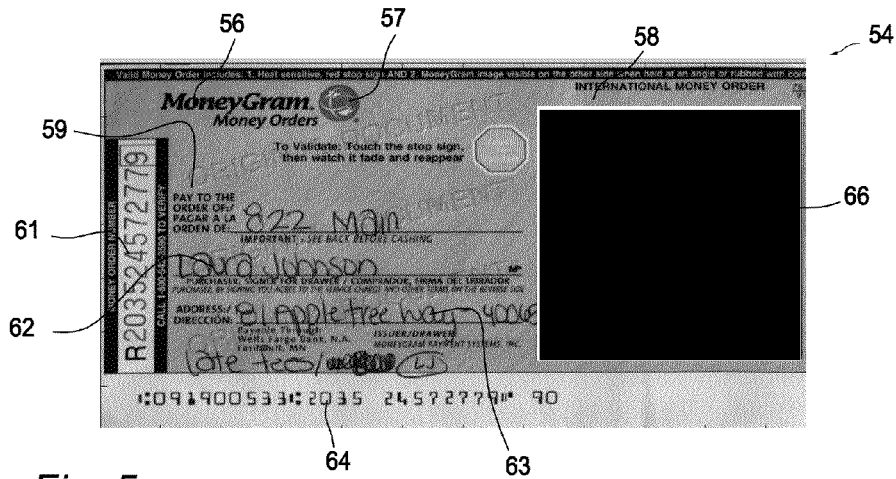
FIG. 5 shows another payment document processed by the equipment of FIG. 1.
Figure 6:
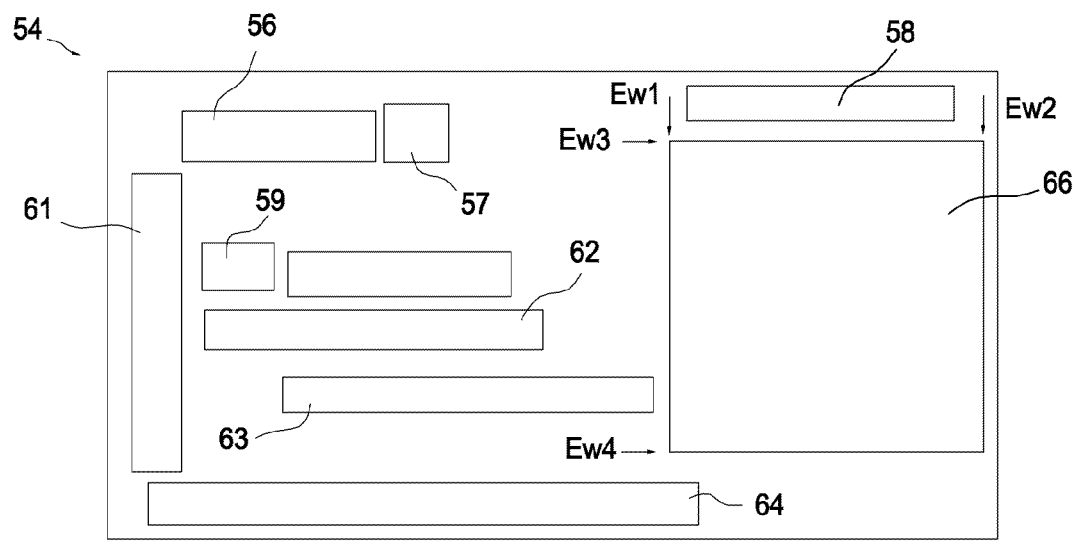
FIG. 6 is a diagram of the document FIG. 5.
Figure 6A:
FIG. 6a shows a detail of the document FIG. 5.
Figure 6B:
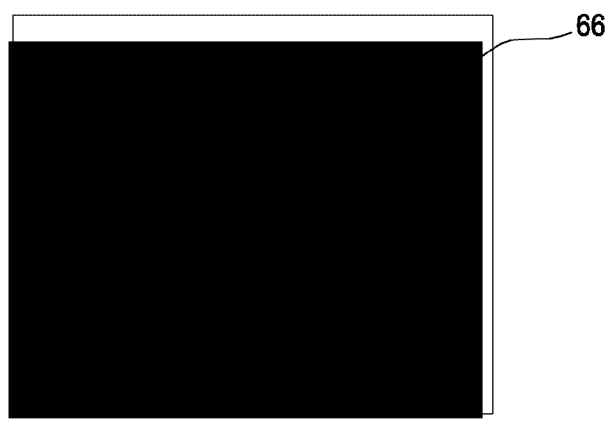
FIG. 6b is a binarization of some details of the document of FIG. 5 by the device of the invention.

FIG. 5 shows another document 32, represented by a payment order 54, which is also widely used for commercial transactions, transfer of money and payment, manageable by the equipment 31 of FIG. 1. In FIG. 6, the payment order 54 is schematically constituted by a form with basic information 56, 57, 58, 59 and 61 including alphanumeric characters and images relating to the issuing institution and a respective logo, type of document, instructions of payment and serial number of the document. Even the payment order 54 contains primary information 62 and 63 including, for example, name and address of the beneficiary, and other information 64 printed with magnetic ink (MICR). The form 51 also includes a data space or data window 66 for sensitive data formed by alphanumeric characters, comprising, for example, the amount to be paid, the date of issuance of the document and control numbers.

Payment orders 41, 54 of the above mentioned types, partially filled with the basic information and the primary information are at disposal of financial institutions and are finalized for the payment or other transactions by adding sensitive data in the respective spaces or windows 51 and 66 and other information, if necessary.

The sensitive data of the payment orders 41 and 54 can be inserted by means of counter printers other than those which generated the basic information or handwritten by the user. The quality of printing or writing (inking) may be poor and the sensitive data could be confused with the background, despite these data can be recognizable at a visual check. This allows the documents to freely circulate up to the presentation to a bank or other office for operations of control, accreditation and annulment. However, problems could arise in processing these documents with automatic machines.

According to current procedures, the payment orders 41, 54 are scanned by the equipment 31 (FIGS. 1 and 7) with formation of matrix image files ScIm. To reduce the processing times and limit the information to be transmitted and stored, the scanning is performed with a resolution, for example, of 200 or 300 DPI, and 8 bits information for 256 levels of gray. The image file ScIm includes, in particular, significant pixels representing the basic information, the primary information and the sensitive data, and background pixels for the background of the document.

The binarization device 39 (FIG. 7) has a first section 71 which provides to binarize the scanned image ScIm for further processing with automatic machines in local and recognizing the sensitive data by means of OCR devices and CAR/LAR decoders. In particular, the section 71 has a memory 72 for the ScIm image, which is stored as a scanned image file StIm, a background identifying stage 73, which identifies the pixels of the background and to be subtracted from the image file ScIm and a primary binarization stage 74 for binarizing the image deprived of the contribution of the background and generating a primary binarized document file PrBn.

For the primary binarization stage 74, the section 71 can use a software of a known type such as, for example, a software following the Niblack's method or the Sauvola's method or the method of Otsu. This binarization process is appropriate for recognizing the basic information and the primary information but, in the case of poor print quality of the sensitive data, the binarization can result in loss of these data.

It has appeared that applying the proposed method to the entire document does not allow, in some cases, to distinguish from the background the significant pixels regarding the sensitive data. However, using high resolution scanning and/or color scanning is not convenient, as for the above mentioned considerations.

The principle on the basis of the invention is inspired to the fact that the sensitive data are printed in well-defined areas of the forms constituting the documents to be binarized. Therefore it is possible to identify the data window from the entire document. Further, morphological operations on the pixels of the data window for eliminating the contribution of the background, binarization of the windows and filtering of spurious pixels highlight the significant pixels with respect to the other pixels of the data window even in the worst situations of evanescent print of the sensitive data.

It can be observed that, for forms similar to the payment orders 41, the sensitive data regarding the amounts are at a side of the currency symbols. Thus, the boundaries of the data window can be easily determined by the position of a reference data point of the currency symbol on the image file. For forms similar to the payment orders 54, identifying textual or graphical images, have been taken into account for localizating the data window with the sensitive data. The identifying images can be constituted by the logo or the words of the issuing institution while a location information for a corresponding data window is associated to the identifying image.

Therefore, a database of recognizable forms has been created including the identifying images and the location information as referred to identifiable reference points extracted from the same forms. Suitably, the binarization device 39 further comprises a currency image and form memory 76, window identifying means 77, window subtracting means 78, background estimating means 79, window background subtracting means 80, window file binarizing means 81, filtering means 82, and file merging means 83.

The currency image and form memory 76 contains the database of the recognizable forms, with the respective indications of the currency symbols or the identifying textual or graphical images and the associated location information for the data windows.

The window identifying means 77 is designed for identifying and locating, in the image file StIm, a pixel subset with significant pixels of the sensitive data. This subset is evidenced as a window image file WnIm.

The window subtracting means 78 is provided for subtracting from the primary binarized document file PrBn the contribution of the pixels of the localized data window to generate a resulting basic binarized file BsBn.

The background estimating means 79 is provided for estimating a background contribution BcWn in the window image file WnIm. The window background subtracting means 80, in turn, subtracts the contribution BcWn from the window image file WnIm, determining a background free window file NoBc. The binarization means 81 binarizes the resulting window image file, where the significant pixels are highlighted with respect to residual background pixels of the window, and obtaining a background free binarized window file WnBn.

The filtering means 82 provides to filter spurious pixels in the background free binarized window file WnBn, forming a binarized window file FlWn 81. Finally, the file merging means 83 is provided for merging the binarized window file FlWn and the basic binarized file BsBn, generating a binarized merged file MrBn.

The background estimating means 79 comprises sequential analyzing means 84, pixel expanding means 86 and pixel eroding means 87. The sequential analyzing means 84 provides a sequential analysis for groups of pixels of the window file WnIm, applying morphological operators, in which the pixel expanding means 86 expands the edges of the regions of pixels with greater contribution of the image, while the pixel eroding means 87 ensures a subsequent erosion for determining an estimate of the background in the window file.

The window identifying means 77 includes, in particular, currency symbol identification means 89 obtained, for example, by template matching techniques, logo recognition and localization means 91 and window delimitation means 92.

Figure 3B:
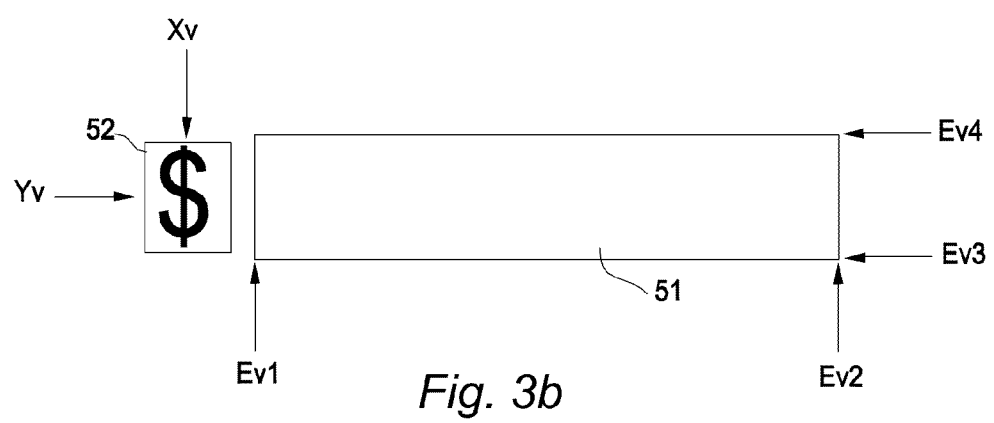
FIG. 3b represents some details of the schematic view of FIG. 3.

The currency symbol identification means 89 identifies, in the files StIm or PrBn, documents similar to the payment order 41, for comparison with data from the memory 76, the currency symbol 52 (the dollar symbol $ in the example) and, based on the location of a reference pixel Xv, Yv, the window delimitation means 92 adds location data Ev1, Ev2, Ev3 and V4 (FIG. 3b) for left, right, top and bottom margins of the data window 51.

For documents similar to the payment order 54, the logo recognition and localization means 91 identifies the location information of the data window associated with the logos, in the files StIm or PrBn, for comparison with the data from the memory 76. The window delimitation means 92 extracts from the memory 76 the location data Ew1, Ew2, Ew3 and Ew4 (FIG. 6) and define the left, right, top and bottom margins of the data window 66 detected on the recognizable forms.

The binarization device 39 may also include pixel integration means 93 for integrating originally missing pixels 93 to the significant pixels, on the basis of vector processing for a better recognition and binarization of the sensitive data.

The binarization device 39 further comprises full image background estimating means 94 which is operative when the window identifying means 77 does not recognize in the memory 76 any currency symbol or identifying image. In this case, the background estimating means 94 actuates the background estimating means 79, the window background subtracting means 80, the binarization means 81 and the filtering means 82 for the entire image file of the document.

The primary binarization stage 74 can use, for the primary binarization after the subtraction of the contribution of the background, the Otsu's, method or the Niblack's method or the method of Sauvola.

With a correction of the type above defined, the binarized file can be reliably obtained by scanning of the document with a minimum resolution, for example, of 200 dpi.

Figure 2A:
FIG. 2a shows a digital image of the document of FIG. 2 in a phase of processing by the equipment of FIG. 1.
Figure 5A:
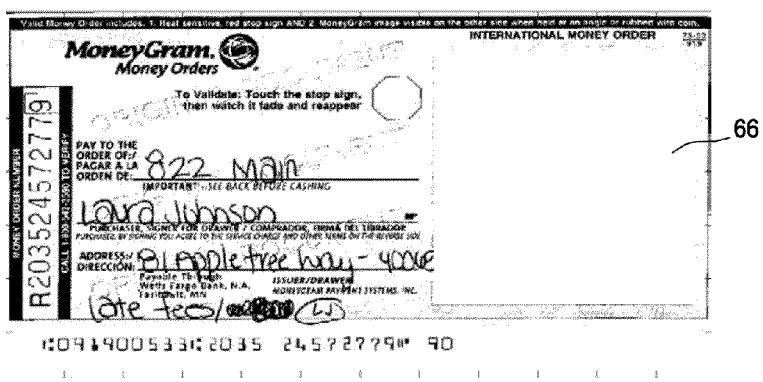
FIG. 5a is a digital image of the document of FIG. 5 in a stage of processing by the equipment of FIG. 1.
Figure 8:
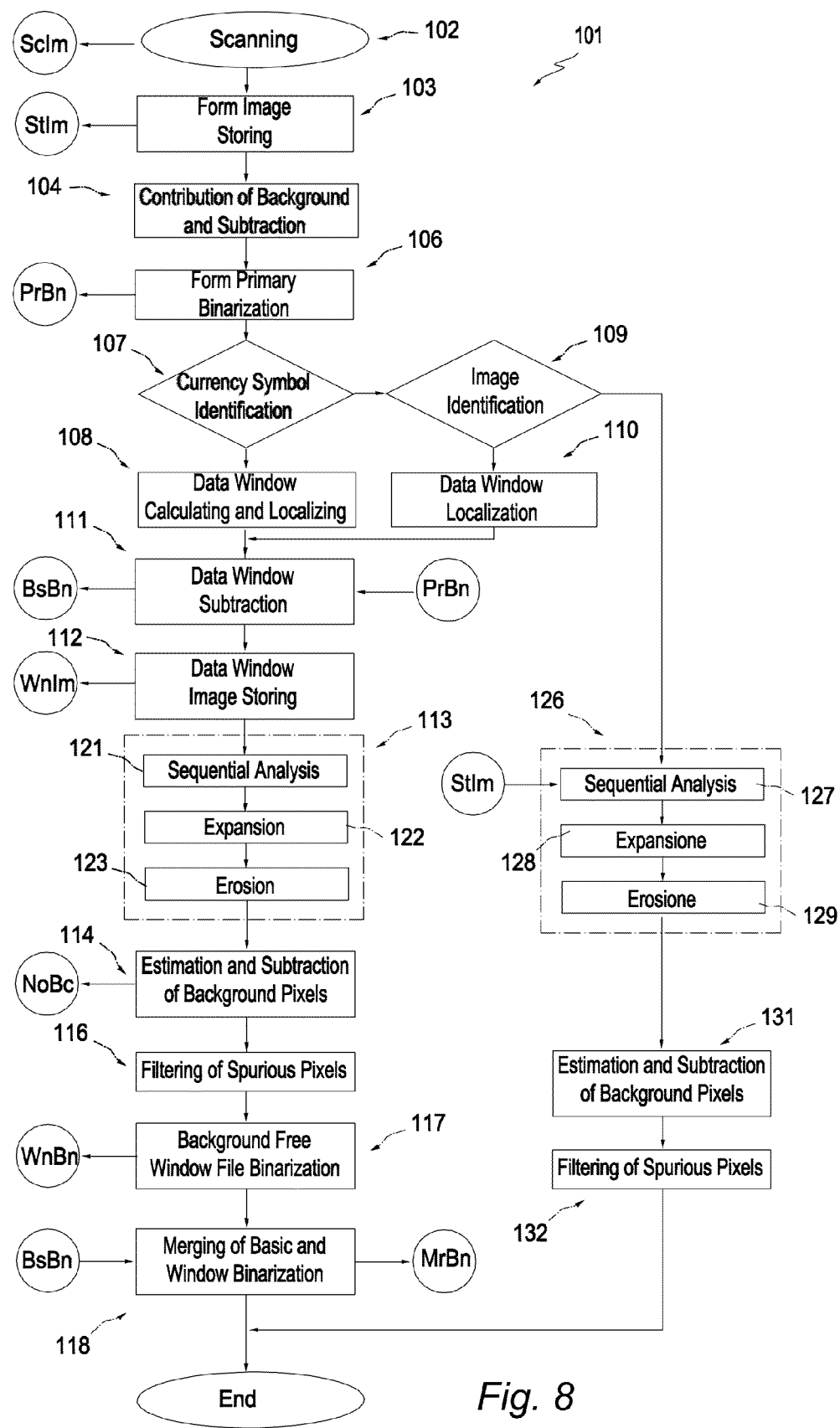
FIG. 8 shows a flow diagram of the binarization method of the invention.

A method of binarization 101 (FIGS. 7 and 8) in accordance with the invention therefore comprises an initial phase 102 in which the equipment 31 will scan the document of payment 32, generating the file ScIm, which is stored in the memory 72 as image files StIm in a step 103. In a step 104, it is estimated the contribution of the background of the file ScIm and the contribution is subtracted from the file ScIm and, in a step 106, the file resulting from the subtraction of the background is binarized giving rise to the primary binarized file PrBn. The visualizations of the PrBn files are represented in FIG. 2a as PrBn-41 for the payment orders with 41 and in FIG. 5a as PrBn-54 for the payment orders 54. From these images it is clear that the sensitive data are no particularly evidenced in the respective data windows 51 and 66.

The method of binarization 101 (FIGS. 7 and 8) includes in particular a decision step 107 where the image PrBn or the image StIm is compared with the images in the memory 72 to identify the currency symbol. In the positive case, step 108, the method proceeds by calculating and localizing the data window 51. In case of failure in recognizing the symbol, the method goes to a decision step 109 where the image StIm or the image PrBn is compared with the images of the memory 72 for identifying the image file 56 or the logo 57. Where this is the case, step 110, the location data of the window 54 associated to the logo or the identifying image are extracted from the memory.

After the location of the window 51 or 66, the method 101 subtracts the pixels of the data windows from the primary binarized document file PrBn in a step 111 determining the resulting basic binarized file BsBn and stores the image of the data window as a file WnIm in a step 112, and proceeds to a phase of estimation 113 for the contribution of the window background BcWn.

It follows a step 114 in which the estimation of the background pixels of the window are subtracted from the pixels of the window file, with formation of the background free window file NoBc having significant pixels in evidence with respect to the residual background pixels of the window. In a step 117, the background free window file is binarized forming the binarized background free window file WnBn, while, in a step 116, spurious pixels indicative of noise are filtered in the WnBn forming the filtered file FlWn. Finally, in a step 118 the filtered file FlWn and the resulting basic binarized file BsBn are merged, generating the binarized merged file MrBn.

Figure 2B:
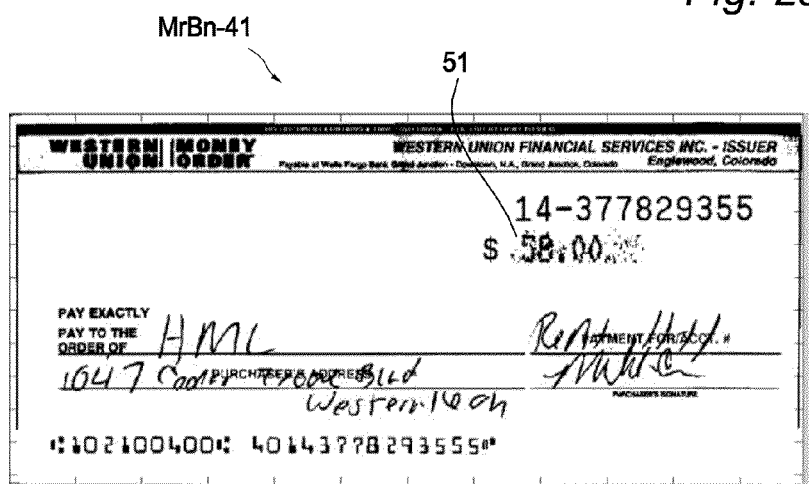
FIG. 2b represents a digital image of the document of FIG. 2, binarized by the device of the invention, in accordance with a first example of execution.
Figure 5B:
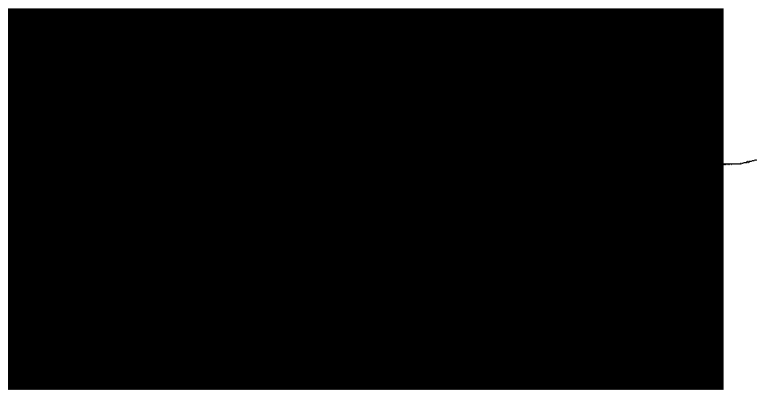
FIG. 5b represents a digital image of the document of FIG. 5, binarized by the device of the invention, in agreement with a second example of execution.

The visualization of the file MrBn is shown in FIG. 2b with MrBn-41 for the documents similar to the payment order 41, and with MrBn-54 in FIG. 5b for documents similar to the payment order 54, and full evidence of the sensitive data in the respective windows 51 and 66.

Figure 4:
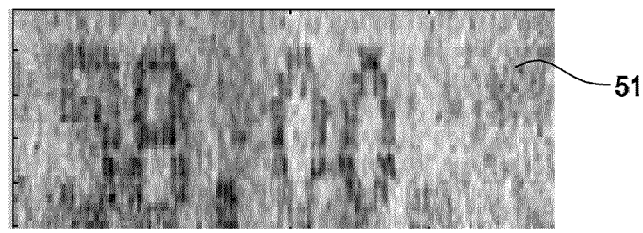
FIG. 4 is another detail of the document FIG. 2.

In detail, the step of estimating the background window 113 comprises a step of sequential analysis 121 for groups of pixels, the implementation in the window file 51 (See FIG. 4) of morphological operators with dilatation of each group of pixels in a step 122, and following erosion of the group of pixels in a step 123. This for executing a correction of the significant pixels.

Figure 4A:
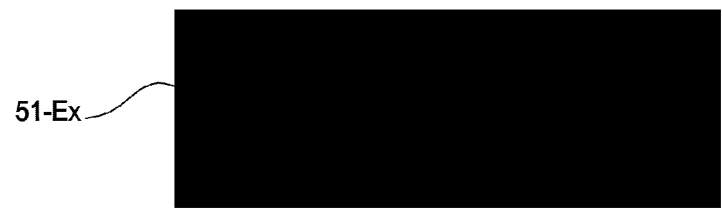
FIG. 4a shows an evolution of the detail of FIG. 4 in an operational phase of the binarization device of the invention.
Figure 4B:
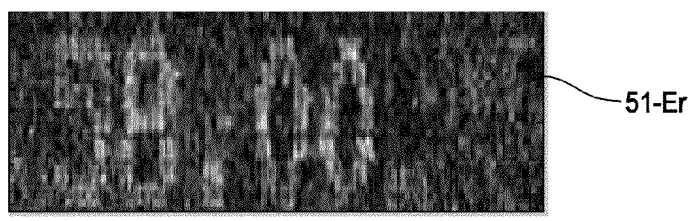
FIG. 4b is an evolution of the detail of FIG. 4 in another operating phase of the device of the invention.

In FIG. 4a is represented with 51-Ex the window file after the step of dilatation and expansion (in particular for the estimating of the background) and, in FIG. 4b, is represented with 51-Er the window file after the subtraction of the estimated background.

Figure 4C:
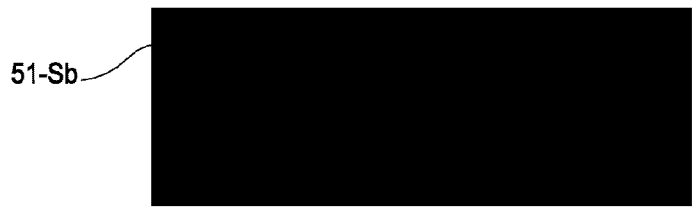
FIG. 4c represents a binarization of the detail of FIG. 4 by the device of the invention.
Figure 4D:
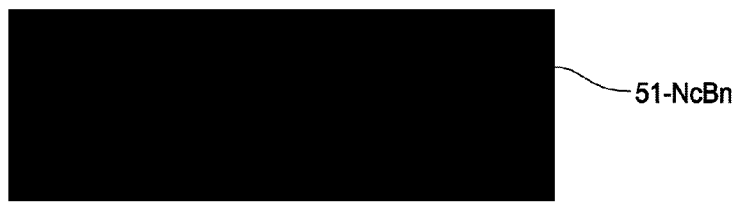
FIG. 4d is a binarization of the detail of FIG. 4 according to the prior art.

In FIG. 4c is represented with 51-Sb the background free binarized window file WnBn after the binarization through, for example, the use of the algorithm of Otsu, with sensitive data well recognizable even before the following filtering step. In FIG. 4d is finally shown as 51-NcBn, with not recognizable sensitive data, the representation of a window file if the algorithm of binarization without any background subtraction would be used.

If no identification image has been recognized in the decision block 109, the method 101 provides a step 126 of estimating the global background of the document. Specifically, the step comprises, for the file StIm, a phase 127 of sequential analysis for groups of pixels, the application of morphological operators with dilatation of each group of pixels in a phase 128, and a phase of erosion 129.

The method further proceeds with a step 130, similar to the step 114, a step 131, similar to the step 116 and a step 132. The step 130 determines the contribution of the background and subtracts the contribution of the background from the pixels of the file Stim, with formation of a background free document file, and having the significant pixel in evidence with respect to the residual background pixels of the window. In the step 131, the background free document file is binarized, while in the step 132 the spurious pixels indicative of noise are filtered in the binarized background free document file, forming a file similar to the binarized merged file MrBn.

The device and the method of the invention are achieved as a software application, which runs as a stand-alone tool for digital image editing or can be embedded in other editing applications available for providing advanced features for applications of digital image editing.

The software may include program forms comprising routines, programs, objects, components, data structures, etc. and be realized as computer-readable program code stored on a computer readable medium. The program can also be distributed on network or computer systems coupled in such a way that it can be stored and executed in a distributed fashion.

Naturally, the principle of the invention remaining the same, the embodiments and the details of construction can broadly be varied with respect to what has been described and illustrated, by way of non-limitative example, without by this departing from the ambit of the present invention.

We claim:

1. A binarization device for payment or accounting documents including sensitive data, wherein said documents are represented by image files having significant pixels associated with the sensitive data and background pixels and wherein the sensitive data are located in a respective data window on a document of a given type of forms and can be constituted by alphanumeric characters, said binarization device comprising primary binarization means for obtaining a primary binarized document file of said document and further comprising:
   memory means for storing, identification files including identifying images and location information associated to respective given types of forms and the localization of the data window with respect to said given types of forms;
   window identification means for identifying and localizing in the image file of said document a window file including the significant pixels of said document, as comparison with the identification files of the memory means;
   background estimation means for estimating the contribution of the background among the pixels of said window file;
   window background subtracting means for subtracting the contribution of the background from the window file, whereby forming a background free window file having significant pixels in evidence with respect to residual background pixels;
   window file binarization means for binarizing the background free window file with formation of a background free binarized window file;
   filtering means for filtering spurious pixels from the background free binarized window file, forming a binarized window file;
   merging means for providing a document binarized image file of the document as merging of the primary binarized document file and the binarized window file to provide the binarized window file in the data window; and wherein
   the background estimation means comprises sequencing means for a sequential analysis on groups of pixels, by applying morphological expansion operators on each group of pixels and following erosion of said group of pixels for estimating the contribution of the background of the window to be subtracted from the pixels of the data window.

2. Binarization device according to claim 1, wherein the identifying images comprise logos or other graphic or textual images identifying issuing institutions of the forms and wherein the window identification means identify and localize the data window in response to data location associated to a recognized logo or other graphic or textual image of said logos or other graphic or textual images.

3. Binarization device according to claim 1 further comprising memory means for a currency symbol image present in given payment or accounting documents and analysis means for recognizing in a file image to be binarized said currency symbol image and a respective position data and wherein the window identification means localize and define the data window in response to the position data of the currency symbol image.

4. Binarization device according to claim 3, wherein the window identification means localize and define the data window by adding edge location parameters to the position data of the currency symbol image.

5. Binarization device according to claim 1, wherein said binarization device further comprises means for integrating missing pixels to the significant pixels on the basis of vectorial processing for better recognition and binarization of the sensitive data.

6. Binarization device according to claim 1, wherein, in absence of identification of the data window, the background estimation means, the window background subtracting means, and the filtering means operate on the whole image file of the document.

7. Binarization device according to claim 1, wherein the window file binarization means are of the type operating according to an algorithm of Otsu.

8. Binarization device according to claim 1, wherein the primary binarization means follow the Niblack's method or the Sauvola's method or the method of Otsu.

9. Binarization device according to claim 1, wherein the image file is obtained by scanning the document with a minimum resolution of 200 dpi.

10. Binarization device according to claim 1, further comprising window subtracting means for subtracting from the primary binarized document file the contribution of the pixel of a localized data window to generate a resulting basic binarized file and wherein said merging means are provided for having the binarized window file in the data window.

11. A method of binarization for payment or accounting documents including sensitive data, represented by file images with significant pixels associated with the sensitive data and background pixels of the document, and wherein the sensitive data are located in a respective data window, said method comprising the following steps:
   binarizing a file image of a document with formation of a primary binarized document file;
   foreseeing memory means for storing, relatively to a series of document forms, identification files having identifying images and location information associated to the type of the document and the localization regarding the data window;
   identifying and localizing in the image file, for comparison with the identification files, a window file, including the significant pixels of the sensitive data and background pixels of the data window;
   estimating the contribution of the background among the pixels of the window file;
   subtracting the estimated background from the pixels of the window file with formation of a background free window file having significant pixels in evidence with respect to residual background pixel of the window;
   binarizing the window file cleared of the contribution of the background with formation of a background free binarized window file,
   filtering spurious pixels in the background free window file, forming a binarized window file, and
   merging the primary binarized document file and the binarized window file to provide the binarized window file in the data window; and wherein
   the estimation of the background comprises a sequential analysis for groups of pixels, by applying, in the window file, morphological expansion operators on each group of pixels and following erosion of said group of pixels.

12. Method of binarization according to claim 11, wherein the identifying images comprise logos or other graphic or textual images identifying issuing institutions of the forms and wherein the window identification means identify and localize the data window in response to data location associated to a recognized logo or other graphic or textual image of said logos or other graphic or textual images.

13. Method of binarization according to claim 11, further comprising the steps:
   providing memory means for a currency symbol image present in given payment or accounting documents;
   analyzing the image file for recognizing said currency symbol image and a respective position data; and
   localizing and delimiting the data window in response to the position data of recognized currency symbol image.

14. Method of binarization according to claim 13, wherein the data window is localized and defined by adding edge location parameters to the position data of the currency symbol image.

15. Method of binarization according to claim 11, further comprising the step of subtracting from the primary binarized document file the contribution of the pixel of the localized data window to generate a resulting basic binarized file; and wherein the merging provides the binarized window file in the data window.

16. Method of binarization according to claim 11, wherein the primary binarization means follow the Niblack's method or the Sauvola's method or the method of Otsu.

17. Method of binarization according to claim 11, wherein the image file is obtained by scanning the document with a minimum resolution of 200 dpi.

* * * * *